United States Patent
Mazzara, Jr.

(10) Patent No.: US 7,526,285 B2
(45) Date of Patent: Apr. 28, 2009

(54) METHOD AND SYSTEM FOR TELEMATIC DEVICE INITIALIZATION MANAGEMENT

(75) Inventor: William E. Mazzara, Jr., Drayton Plains, MI (US)

(73) Assignee: General Motors Corporation, Detroit, MI (US)

( * ) Notice: Subject to any disclaimer, the term of this patent is extended or adjusted under 35 U.S.C. 154(b) by 681 days.

(21) Appl. No.: 10/217,279

(22) Filed: Aug. 12, 2002

(65) Prior Publication Data

US 2004/0029574 A1    Feb. 12, 2004

(51) Int. Cl.
*H04Q 3/00* (2006.01)
(52) U.S. Cl. .................. 455/419; 455/418; 455/420; 455/410; 455/433; 455/551; 455/560; 455/422.1; 455/414.1
(58) Field of Classification Search ............. 455/419, 455/466, 426.2, 502, 517, 435.1, 456, 403, 455/426, 433, 410, 411, 418, 420, 433.56, 455/422.1, 414.1, 551, 550, 560; 370/318, 370/352; 345/744; 713/176, 168, 170; 380/247–249
See application file for complete search history.

(56) References Cited

U.S. PATENT DOCUMENTS

RE39,878 E * 10/2007 Leung et al. ............. 455/419

| | | | |
|---|---|---|---|
| 2002/0123335 A1 * | 9/2002 | Luna et al. ............... | 455/419 |
| 2003/0055912 A1 * | 3/2003 | Martin et al. ............ | 709/218 |
| 2003/0194987 A1 * | 10/2003 | Pattabiraman et al. ... | 455/403 |

OTHER PUBLICATIONS

A publication entitled, *"Over-the-Air Service Provisioning of Mobile Stations in Spread Spectrum Systems,"* TIA/EIA/IS-683-A, Dated May 1998.

* cited by examiner

*Primary Examiner*—Charles N Appiah
*Assistant Examiner*—Randy Peaches

(57) ABSTRACT

The invention provides a method for initializing a telematic communication unit by initiating a first over-the-air service provisioning session between a wireless service provider and the telematic communication unit, receiving at least one interactive initialization data request from the wireless service provider at the telematic communication unit, determining at least one automated initialization response within the telematic communication unit as a function of the interactive initialization data, transmitting the automated initialization response from the telematic communication unit to the wireless service provider, and terminating the first over-the-air service provisioning session between the wireless service provider and the telematic communication unit.

13 Claims, 2 Drawing Sheets

METHOD AND SYSTEM FOR TELEMATIC DEVICE INITIALIZATION MANAGEMENT

FIELD OF THE INVENTION

In general, the invention relates to wireless communication systems. More specifically, the invention relates to telematic device communications and in particular, to a method and system for managing initialization of a telematic communication unit.

BACKGROUND OF THE INVENTION

Telematic communication units (TCU's), include devices such as cellular phones, personal data assistants (PDA's), Global Positioning System (GPS) devices, and on-board Vehicle Communication Units (VCU's). When used in conjunction with a Wide Area Network (WAN), such as a cellular telephone network or a satellite communication system, TCU's have made it possible for a person to send and receive voice communications, data transmissions, and facsimile (FAX) messages from virtually anywhere on earth. Such communication is initiated at the TCU when it is turned on, or by entering a phone number to be called, or in many cases, by pressing a preprogrammed button on the TCU or speaking a voice command causing the TCU to automatically complete the process of dialing the number to be called. A radio communication link may be established between the TCU and a Wide Area Network (WAN), using a node of the WAN near the TCU.

In cellular telephone systems, a node is commonly referred to as a "cellular base station." Once a radio communication link between the TCU and the cellular base station has been established, the base station may utilize a combination of additional cellular stations, conventional telephone wire line networks, and possibly even satellite systems to connect the TCU to the number to be called.

Prior to the TCU being permitted access to a communication system however, it must first be activated. Typically, TCU activation requires that TCU specific information or a response to an activation query be keyed into the TCU manually, often by a vendor of the TCU. The information or response may be determined by the vendor using data provided with the device and from personal knowledge of proper replies for over-the-air service provisioning (OTASP) requests. Since the proper response relies on the vendor's personal knowledge and interpretive responses to be manually keyed into the TCU, an inaccurate or inappropriate data transmission may occur.

Some TCU's may also require activation over multiple service providers, such as a TCU used in conjunction with a wireless communication services provider and a mobile vehicle communication system (MVCS), or may require activation in communication with associated optional equipment. The mobile vehicle communication system may offer such services to the TCU user as navigation, providing location and destination information, roadside assistance, and may additionally offer aid in the motor vehicles operation. The optional equipment required to function in unison with the TCU and the MVCS service can include a mobile vehicle, a GPS, and/or numerous other optional peripherals. When multiple service providers or communication systems require a TCU to be proprietarily initialized, manually keyed responses must again be supplied, and in a fashion that may be proprietary for each. In addition, if the TCU is associated with optional equipment, the optional equipments attributes may also be required for system or equipment initialization. This may provide multiple opportunities for the inaccurate or misinterpreted data to be manually inserted.

Thus, there is a significant need for a method and system for refining the initialization of a telematic communication unit and it's associated equipment that overcome the above disadvantages and shortcomings, as well as other disadvantages.

SUMMARY OF THE INVENTION

One aspect of the invention presents a method for initializing a telematic communication unit by initiating a first over-the-air service provisioning session between a wireless service provider and the telematic communication unit, and receiving at least one interactive initialization data request from the wireless service provider at the telematic communication unit. The method continues by determining at least one automated initialization response within the telematic communication unit as a function of the interactive initialization data, transmitting the automated initialization response from the telematic communication unit to the wireless service provider, and terminating the first over-the-air service provisioning session between the wireless service provider and the telematic communication unit.

Another aspect of the invention presents a system for initializing a telematic communication unit. The system includes a means for initiating a first over-the-air service provisioning session between a wireless service provider and the telematic communication unit, and a means for receiving at least one interactive initialization data request from the wireless service provider at the telematic communication unit. Additionally, the system provides a means for determining at least one automated initialization response within the telematic communication unit as a function of the interactive initialization data, a means for transmitting the automated initialization response from the telematic communication unit to the wireless service provider, and a means for terminating the first over-the-air service provisioning session between the wireless service provider and the telematic communication unit.

Another aspect of the invention provides a computer readable medium for storing a computer program. The computer program is comprised of computer readable code for initiating a first over-the-air service provisioning session between a wireless service provider and a telematic communication unit, and computer readable code for receiving at least one interactive initialization data request from the wireless service provider at the telematic communication unit. Additionally, computer readable code for determining at least one automated initialization response within the telematic communication unit as a function of the interactive initialization data, computer readable code for transmitting the automated initialization response from the telematic communication unit to the wireless service provider, and computer readable code for terminating the first over-the-air service provisioning session between the wireless service provider and the telematic communication unit.

The foregoing and other features and advantages of the invention will become further apparent from the following detailed description of the presently preferred embodiment, read in conjunction with the accompanying drawings. The detailed description and drawings are merely illustrative of

DETAILED DESCRIPTION OF A PREFERRED EMBODIMENT

Figure 1:
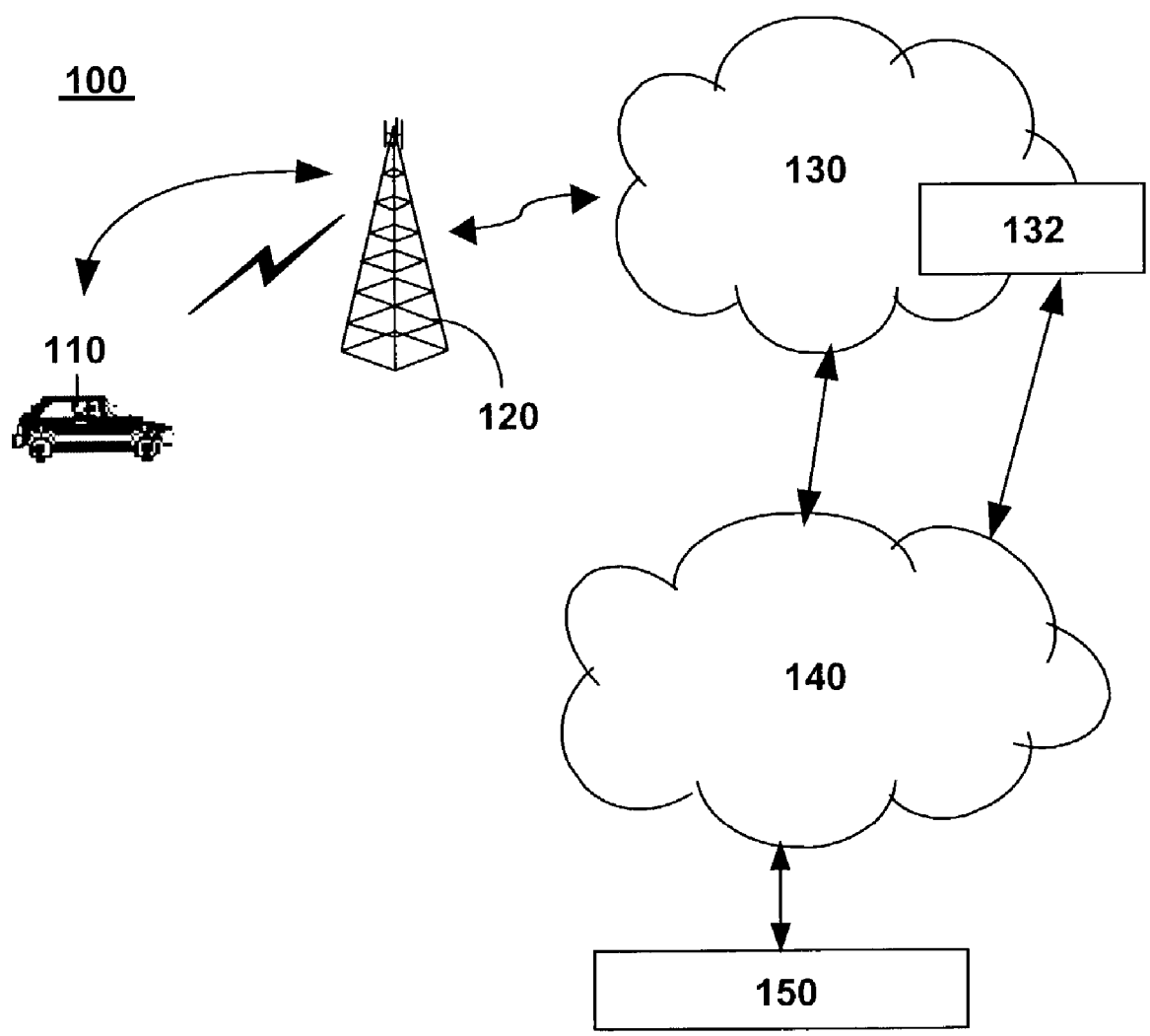
FIG. 1 is a schematic diagram for one embodiment of a system for accessing a telematic device using a wireless communication system, in accordance with the present invention.

FIG. 1 shows an illustration for one embodiment of a system for communicating a telematic communication unit (TCU) within a mobile vehicle with a wireless communication system in accordance with the present invention. Additional embodiments may provide that the TCU be isolated or in contact with additional or alternative equipment and mechanisms. The system of FIG. 1 may be referred to as a mobile vehicle communication system (MVCS) 100. The mobile vehicle communication system 100 may contain at least one mobile vehicle communication unit (TCU within the mobile vehicle) 110, at least one wireless service provider 120, at least one communication network 130, at least one short message service center 132, at least one land network 140, and at least one call center 150. For one embodiment of the invention, the call center 150 may serve as or be in communication with a remote activation server and an activation database. An additional embodiment of the invention may provide the remote activation server and the activation database to be in communication with the mobile vehicle communication unit 110, the wireless service provider 120, and/or the communication network 130.

Mobile vehicle communication unit 110 may contain a TCU such as an analog or digital phone, with suitable hardware and software for transmitting and receiving data communications. The TCU may also be referred to as a module, network access device (NAD), or as a part of the MVCS. The mobile vehicle communication unit 110 may contain a wireless modem for transmitting and receiving data. Mobile vehicle communication unit 110 may contain a digital signal processor with software and additional hardware to enable communications with the mobile vehicle and to perform other routines and requested services. Mobile vehicle communication unit 110 may contain a global positioning system (GPS) unit capable of determining synchronized time and a geophysical location of the mobile vehicle. Mobile vehicle communication unit 110 may send to and receive radio transmissions from wireless service provider 120. Mobile vehicle communication unit 110 may contain a speech recognition system (ASR) capable of communicating with the wireless vehicle communication device. The wireless vehicle communication device may be capable of functioning as any part of or all of the above communication devices and, for one embodiment of the invention, may be capable of data storage, and/or data retrieval, and/or receiving, processing, and transmitting data queries. Additionally, the wireless vehicle communication device may be Over-the-air Service Provisioning (OTASP) compatible, and may utilizes an OTASP standard known in the art as TIA/EIA/IS-683-A, and associated standards and revisions.

Wireless service provider 120 may be a wireless communications carrier or a mobile telephone system. The mobile telephone system may be an analog mobile telephone system operating over a prescribed band nominally at 800 MHz. The mobile telephone system may be a digital mobile telephone system operating over a prescribed band nominally at 800 MHz, 900 MHz, 1900 MHz, or any suitable band capable of carrying mobile communications. Wireless service provider 120 may transmit to and receive signals from mobile vehicle communication unit 110. Wireless service provider 120 may transmit to and receive signals from a second mobile vehicle communication unit 110. Wireless service provider 120 may be connected with communications network 130.

Communications network 130 may comprise a mobile switching center. Communications network 130 may comprise services from at least one wireless communications companies. Communications network 130 may be any suitable system or collection of systems for connecting wireless service provider 120 to at least one mobile vehicle communication unit 110 or to a call center.

Communications network 130 may include at least one short message service centers 132. Short message service center 132 may prescribe alphanumeric short messages to and from mobile vehicle communication unit 110. Short message service center 132 may include message entry features, administrative controls, communication initialization features, and message transmission capabilities. Short message service center 132 may store and buffer the messages. Short message services may include functional services such as paging, text messaging and message waiting notification. Short message services may include other telematic services such as broadcast services, TCU initialization monitoring and management, and database-driven information services.

Land network 140 may be a public-switched telephone network. Land network 140 may be comprised of a wired network, an optical network, a fiber network, another wireless network, or any combination thereof. Land network 140 may comprise an Internet protocol (IP) network. Land network 140 may connect communications network 130 to a call center. Communication network 130 and land network 140 may connect wireless service provider 120 to a communication node, interactive initialization manager (TCU initialization monitor) or call center 150. One embodiment of the invention provides that the interactive initialization manager (IIM) may be a device or program capable of monitoring a TCU initialization session communicated between a TCU and a wireless service provider 120, and may be in communication with or part of any or all of the entities described in association to the MVCS 100.

Call center 150 may be a location where many calls can be received and serviced at the same time, or where many calls may be sent at the same time. The call center may be a telematic call center, prescribing communications to and from mobile vehicle communication unit 110. The call center may be a voice call center, providing verbal communications between an advisor in the call center and a subscriber in a mobile vehicle. The call center may be a voice activated call center, providing verbal communications between an ASR unit and a subscriber in a mobile vehicle. The call center may contain any of the previously described functionalities specifically for one embodiment of the invention, part or all of the functionality of an IIM.

In another embodiment of the invention, short message service (SMS) communications may be sent and received according to established protocols such as IS-637 standards for SMS, IS-136 air interface standards for SMS, and GSM (global system for multiple communications) 03.40 and 09.02 standards. These protocols allow for example, short messages comprised of up to 160 alpha-numeric characters and may contain no images or graphics. Similar to paging, an SMS communication may be posted along with an intended recipient, such as a communication device in mobile vehicle communication unit 110. The SMS communication may be sent by a communication services manager in a call center, transferred to a short message service center (SMSC), and conveyed to the intended recipient.

An SMS message may be initiated in response to a subscriber request, such as a request to unlock the vehicle doors. An SMS message may be sent automatically, for example, when an update or vehicle preset value is desired or when a diagnostic message is needed. In another embodiment of the invention, a SMS message may be sent to request data collection, data retrieval, and/or data submission from the TCU for the initialization of the TCU, or an associated device in communication with the TCU.

A communication services database in communication with the MVCS may contain records on at least one mobile vehicle communication unit 110, at least one TCU, and at least one associated device in communication with the TCU. In one embodiment of the invention, the communication services database may be in communication with or contain in part or in whole, an activation database. In a preferred embodiment of the invention, as described within the detailed description, the IIM, activation database, and activation server are in part or in whole within the mobile vehicle communication system 100. In an alternative embodiment of the invention however, the IIM, activation database, and activation server may be in part or in whole external to but in communication with the mobile vehicle communication system 100, and may be referenced as a third party server. An example of a third party server may be an out of area wireless service provider, wherein the out of area wireless service provider is in communication with the local wireless service provider which in turn has connectivity to the TCU. The out of area wireless service provider may have the IIM functionality required for initializing the TCU. Another example may be a manufacturer of the TCU or a programmable device in communication with the TCU that also requires initialization prior to normal activation. The initialization may require manufacturer specific data available through the IIM operation. In this example, the manufacturer may be incapable of wireless communication and therefor requires an alternative network connection to the local wireless service provider in order to communicate with the TCU or a TCU associated device.

A portion of communication services database may be dedicated to short message services. Records in communication services database may include vehicle identification, location information, diagnostic information, initialization information, status information, recent action information, and vehicle passenger (user) and operator (user) defined preset conditions regarding mobile vehicle communication unit 110

Figure 2:
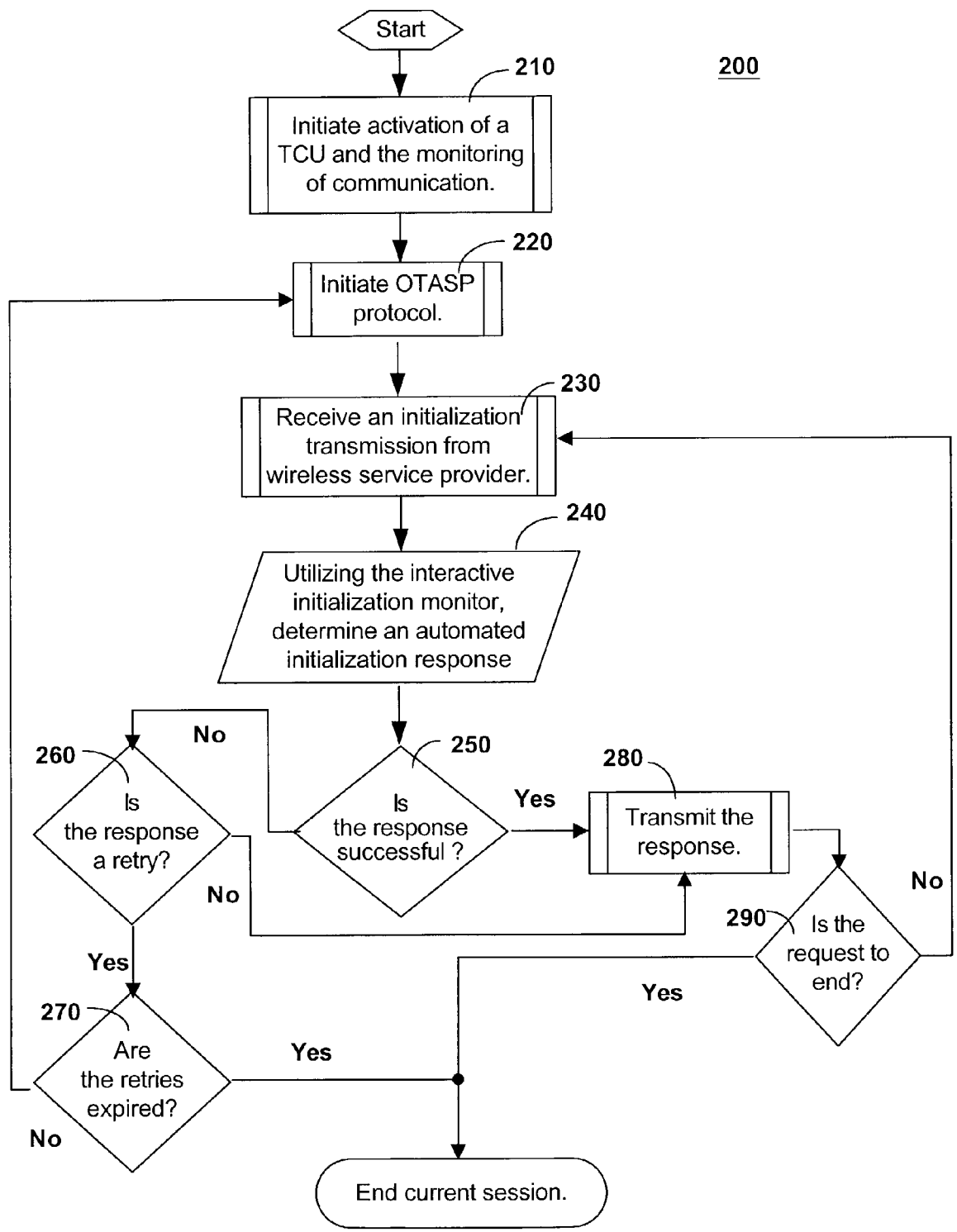
FIG. 2 is a flowchart representation for one embodiment of a method for initializing a telematic communication unit utilizing the system of FIG. 1, in accordance with the present invention.

One embodiment of the invention is illustrated in FIG. 2 as a flowchart representation of an OTASP Process (method) 200 for managing the initializing of a TCU, and may be referred to as an interactive initialization manager. The interactive initialization manager 200 may provide an autonomous system to interact with a wireless service provider and a TCU to initialize the TCU for future communication between the TCU and the wireless service provider. The interactive initialization manager 200 is presented as a flowchart to illustrate the travel and mode of interactive initialization data and its associated automated initialization response, as they relate to the interactive initialization manager, and may utilize the same block to illustrate the mode of the method and not necessarily the content, as will be demonstrated below.

The interactive initialization manager 200 may utilize timers and counters as are known in the art, to monitor the state of the TCU initialization during its OTASP session, to insure against failure, and to reinitiate the OTASP session recursively if warranted. Another embodiment of the invention may provide that an activation database provide at least one activation attribute to the activation server in relation to the TCU or an associated device. The activation server for this embodiment may be the wireless service provider, or a second wireless service provider (third party server) as previously described. Additionally, the method 200 for initializing a TCU related device provides for the initialization to be performed without the use of a TCU user interface (keypad). A further embodiment of the invention may provide that the methods provided can be used for Code Division Multiple Access (CDMA), Time Division Multiple Access (TDMA), and Global System For Multiple Communications (GSM) compatible modes of wireless communications, and may additionally be implemented within alternative modes of wireless communication.

Upon activation of the method 200, a vehicle communications processor (VCP) may proceed with an OTASP initializing process as specified in International Standard TIA/EIA/IS-683, to attain a proper number assignment module (NAM) parameter. TIA/EIA/IS-683 is a standard known in the art for over-the-air service provisioning of mobile stations. A mobile station operating in either the analog or the spread spectrum (CDMA) mode conforming to TIA/EIA-95-B, TIA/EIA/IS-95-A (inclusive of TSB74), or ANSI J-STD-008 and this standard (TIA/EIA/IS-683) can be activated over the air in any system conforming to these standards. The VPC may be a TCU or TCU associated device, and may be hardware that can be applied within a vehicle, and can communicate with the external world. The method 200 may monitor and manage timers and counters as are known in the art, and may process and alter the timers and counters in accordance with their associated definitions provided below, and in the International Standard TIA/EIA/IS-683.

The method 200 may include at least one of the following timers or an alternative timer not listed, for use as indicated by their definition here or as is known in the art:

a CDMA origination timer: An internal timer to the network access device (NAD), not configurable by the VCP. The CDMA origination timer can limit the time taken to send a CDMA origination.

a OTASP initialization timer: A VCP timer that may limit the time to the first OTASP message.

a OTASP response timer: A VCP timer that may limit the time the VCP takes to respond to an OTASP request.

a OTASP Request timer: A VCP timer used to limit the length of time the VCP waits for the next OTASP request.

a OTASP Commit timer: A VCP timer used to limit the time the VCP takes to respond to an OTASP commit request.

In one embodiment of the invention, the method 200 may begin with a TCU being activated 210 to initiate an over-the-air service provisioning session 220. Alternatively, a VCP (TCU associated device) may instruct the TCU to activate and initiate the over-the-air service provisioning session 220. In the preferred embodiment of the invention, the activation of the TCU also activates the monitoring of any communications transmitted to or received by the TCU. The over-the-air service provisioning session 220 may be initiated by receiving an initialization transmission 230 from a wireless service provider using the proper OTASP access number from an international dialing table. The initialization transmission may open an active communication of at least one interactive initialization data request and a corresponding automated initialization response between the TCU and the wireless service provider. The automated initialization response may be governed by the Interactive Initialization Monitor. Upon the OTASP session (protocol) initiation 220, the TCU may initiate the CDMA origination timer and reset a reorder counter. For this embodiment of the invention, 'initiate' in the context of a timer may mean to reset and start the timer.

Another embodiment of the invention may utilize the interactive initialization monitor to determine an automated initialization response 240. The interactive initialization monitor may further determine whether a response is successful 250. If the response is successful, it can be transmitted from the initialization monitor to the wireless service provider 280. With the response transmitted, the interactive initialization monitor may determine if there is a request to end 290. If there is a request to end, the current session may end. If there is not a request to end, the interactive initialization manager 200 may return to receive an initialization transmission from the wireless service provider 230.

If the response shown in block 250 was unsuccessful, the interactive initialization manager 200 may determine if the response is a retry 260. If it is not a retry, the response may be transmitted from the initialization monitor to the wireless service provider 280. With the response transmitted, the interactive initialization monitor may determine if there is a request to end 290. If there is a request to end, the current session may end. If there is not a request to end, the interactive initialization manager 200 may return to receive an initialization transmission from the wireless service provider 230.

If the response is a retry 260, the interactive initialization manager 200 may determine if the number of retries has expired 270. If the number of retries has been reached, the current OTASP service provisioning session may be terminated. If the retry limit has not been reached, 270 the interactive initialization manager 200 may again initiate an OTASP protocol session 220.

The above-described methods and implementation for initializing a telematic device are example methods and implementations. These methods and implementations illustrate one possible approach for initializing a TCU or an associated device in communication with the TCU, and may utilize part or all of the described method for the purpose of providing autonomous TCU initialization. The actual implementation may vary from the method discussed. Moreover, various other improvements and modifications to this invention may occur to those skilled in the art, and those improvements and modifications will fall within the scope of this invention as set forth below.

The present invention may be embodied in other specific forms without departing from its spirit or essential characteristics. The described embodiments are to be considered in all respects only as illustrative and not restrictive.

I claim:

1. A method for managing initialization of a telematic communication unit, comprising;
    executing an autonomous process within an in-vehicle device;
    under control of the autonomous process, automatically initiating a first over-the-air provisioning session, wherein the autonomous process causes the in-vehicle device to initiate contact with a remote provisioning service;
    monitoring the first provisioning session in the in-vehicle device and determining whether the first provisioning session is complete;
    in response to the determination, providing a control signal indicating successful provisioning if the first provisioning session is complete; and
    in response to the determining, continuing the autonomous process to automatically initiate a second provisioning session if the first provisioning session is not complete.

2. The method claim 1 wherein the second provisioning session is recursive of the first provisioning session.

3. The method of claim 1 further comprising storing at least one initialization parameter within the in-vehicle device.

4. The method of claim 1 wherein the in-vehicle device is compatible with at least one standard selected from the group consisting of code division multiple access, time division multiple access, and global system for multiple communications.

5. The method of claim 1 wherein the autonomous process is executed by an interactive initialization manager.

6. The method of claim 1 wherein at least one of the first provisioning session and second provisioning session comprises:
    attaining a number assignment module parameter.

7. The method of claim 1 wherein determining whether the first provisioning session is complete is a function of counters and timers.

8. A computer readable medium storing a computer readable program for managing initialization of a thematic communication unit comprising:
    computer readable code for executing an autonomous process within an in-vehicle device;
    under control of the autonomous process, automatically causing the in-vehicle device to initiate a first over-the-air provisioning session, wherein the in-vehicle device initiates contact with a remote provisioning service;
    computer readable code for monitoring the first provisioning session in the in-vehicle device and determining whether the first provisioning session is complete;
    in response to the determination, providing a control signal indicating successful provisioning if the first provisioning session is complete; and
    in response to the determination, continuing the autonomous process to automatically initiate a second provisioning session if the first provisioning session is not complete.

9. The medium of claim 8 further comprising computer readable code for storing at least one initialization parameter within the in-vehicle device.

10. The medium of claim 8 further comprising computer readable code for attaining a number assignment module parameter.

11. A system for managing initialization of a telematic communication unit comprising:
    means for executing an autonomous process within an in-vehicle device;
    means for causing the in-vehicle device to initiate a first over-the-air provisioning session with a remote provisioning service, wherein the means for causing includes at least the autonomous process, and wherein the in-vehicle device initiates contact with the remote provisioning service;
    means for monitoring the first provisioning session in the in-vehicle device and determining whether the first provisioning session is complete;

in response to the determination, providing a control signal indicating successful provisioning if the first provisioning session is complete; and in response to the determination, continuing the autonomous process to automatically initiate a second provisioning session if the first provisioning session is not complete.

12. The system of claim 11 further comprising means for storing at least one initialization parameter within the in-vehicle device.

13. The system of claim 11 further comprising moans for attaining a number assignment module parameter.

* * * * *